UNITED STATES PATENT OFFICE.

CLARK D. PAGE, OF ROCHESTER, NEW YORK.

COMPOSITION FOR ARTIFICIAL STONE.

Specification forming part of Letters Patent No. 27,563, dated March 20, 1860.

*To all whom it may concern:*

Be it known that I, CLARK D. PAGE, of Rochester, in the county of Monroe, in the State of New York, have invented a new and Improved Mode of Manufacturing a Glauconitic Building-Stone; and I do hereby declare that the following is a full and exact description thereof, reference being had to the accompanying specimen.

The nature of my invention consists in providing for a new, superior, and cheap building material, in imitation of granite, having the same hardness and durability.

To enable others skilled in the art to make use of my invention, I will proceed to describe composition and operation.

The material used for my glauconitic building-stone is the glauconitic earth found in different geological formations of our earth, but more especially in the upper, secondary, or cretaceous formation—particularly in the State of New Jersey. This material is generally called the "green sand" of the cretaceous or tertiary formations, and in New Jersey "marl," without being really either a sand or a marl, as I shall demonstrate below. This glauconitic earth, or "loam," as it may properly be called, is in its natural state rather indurate and lumpy and contains a considerable quantity of protoxide of iron in the state of a silicate of iron. In order to disintegrate the material and convert the protoxide of iron into a peroxide and prevent a peroxidation in the stone, which must necessarily render it brittle, the glauconitic loam is quarried a long time before its use and exposed to the influence of the atmosphere. It is best to quarry it in the fall and expose it, in layers not more than from twelve to eighteen inches in thickness, to the frost during the winter. When the glauconitic earth or loam is sufficiently disintegrated and the protoxide of iron converted into a peroxide it must be reduced to a uniform powder. In order to regulate the moisture of the same, and to render the pressure more uniform, it is then heated to at least 212° of heat, put in molds, and submitted to a pressure about equal to the weight of one hundred tons to the square foot.

If carefully prepared, my glauconitic building-stone does not only resemble closely the blue granite of the Eastern States, but is fully equal to it in hardness and durability, resisting any climatic effect and temperature fully as well as that granite. This is the consequence of the excellent cementing material contained in it.

The following is an exact analysis of the glauconitic earth or loam as it is found in Monmouth county, in the State of New Jersey:

| | | |
|---|---:|---|
| Protoxide of iron (existing as silicate of iron or glauconitic grains) | 16.662 | per cent. |
| Alumina | 6.837 | " |
| Magnesia | 1.934 | " |
| Lime | 3.573 | " |
| Potash (in the state of a silicate of potash) | 4.579 | " |
| Soluble silica (in combination with iron and potash) | 35.794 | " |
| Insoluble silica (as a very fine sand) | 16.788 | " |
| Phosphoric acid (combined with lime and iron) | 2.241 | " |
| Sulphuric acid (combined with lime) | 1.054 | " |
| Carbonic acid | 1.587 | " |
| Nitrogen | 0.028 | " |
| Water in combination | 8.921 | " |
| | 100.000 | parts. |

This glauconitic earth, although called "green sand," can in reality not be a sand, containing only about seventeen per cent. of a very fine sand. Its other silicious contents are silicates of potash and iron, which, although granulated, cannot be called sand. This glauconitic loam is in New Jersey, where it is found, generally called "marl," simply on account of its fertilizing quality; but it is by no means a marl. It contains only about four per cent. of lime, as the analysis shows, whereas a marl must contain from ten to ninety per cent. of lime, and, besides, a quantity of recent shells. Conf: James D. Dana's System of Mineralogy, pages 525 and 593, second edition of 1844.

The ingredients acting as a cement are the oxide of iron, the alumina, and the different silicates, which, by means of the pressure and also the heat applied, cement the glauconitic mass to a stone much harder and more durable than any artificial stone hitherto invented.

In order to give my glauconitic building-stone a different color, or to modify the color and to form it under a lesser degree of pressure, I add either a certain quantity of hydraulic or Rosendale cement, or even sulphate or hydrate of lime. The cement imparts to it a darker, the lime a lighter, color. Both colors can be increased by increased quantities of cement or lime. This addition is made by mixing either the cement or the lime thoroughly with the glauconitic earth in a moist state and then heating it in order to drive off the excess of moisture and adapt it more for the press. When the stones have been subjected to the necessary pressure they are put in drying-sheds for a sufficient time, and are then ready for use.

The shape of the building-stones is entirely optional. They can be pressed into any size, from that of bricks to blocks three or four feet long and of considerable width and thickness.

I know several patents have been granted for the invention of artificial stones, bricks, or building-blocks. Among them are only two to which my invention may have a slight similarity. These are, first, the patent of Ambrose Foster, Portland, Wisconsin, and Elizabeth A. Messinger, administratrix, and William Spencer, granted in January, 1855; second, the patent of St. Julien Ravenel, granted in August, 1856; but there is no collision between those patents and my claim. The first of these patents was granted for a composition of silicious sand in a coarse state, as free as possible from admixture with clay or earth, with freshly-slaked lime. The claim of the first of those patents is entirely confined to a mixture of pure coarse sand and lime. This is proven by the granting of the second patent for a mixture of pulverized marl and slaked lime. My claim does not embrace sand, but glauconitic earth or loam. This is called "green sand," it is true, but, containing only about seventeen per cent. of sand, it does not deserve that name. My claim embraces actually such particles as are discarded from the coarse sand, according to the specification of the first patent—viz., alumina, oxide of iron, &c. Could I discard the sand out of my material I would willingly do it. It is superfluous. I do also not claim the addition of lime as a cement, but only as a coloring-matter. The second patent has been granted for the manufacture of an artificial stone of pulverized marl and slaked lime. The material to which I lay claim is no marl, as I have proven by the best of authorities. If, therefore, after the granting of the first patent for a mixture of sand and lime a second has been granted for marl and lime, there cannot be any objection to the granting of a third for glauconitic earth, it being neither sand nor marl, and heat being used, which has not been claimed in either of the above patents.

Disclaiming now herewith expressly the manufacture of an artificial stone of sand and lime, as well as of marl and lime, I limit my claim to the manufacture of an artificial glauconitic building-stone in the above-stated manner, of glauconitic earth or loam, such as it is found in the cretaceous and some other geological formations, with the admixture of either cement or sulphate or hydrate of lime, substantially as described.

CLARK D. PAGE.

Witnesses:
LEWIS HARPER,
H. POMEROY.